(12) United States Patent
Brooks et al.

(10) Patent No.: US 6,879,325 B1
(45) Date of Patent: Apr. 12, 2005

(54) MULTI-VARIABLE PROCESSES

(75) Inventors: Robin William Brooks, Gerrards Cross (GB); John Gavin Wilson, London (GB)

(73) Assignee: Curvaceous Software Limited, Buckinghamshire (GB)

(*) Notice: Subject to any disclaimer, the term of this patent is extended or adjusted under 35 U.S.C. 154(b) by 100 days.

(21) Appl. No.: 10/130,927

(22) PCT Filed: Nov. 27, 2000

(86) PCT No.: PCT/GB00/04506
§ 371 (c)(1),
(2), (4) Date: May 23, 2002

(87) PCT Pub. No.: WO01/38831
PCT Pub. Date: May 31, 2001

(30) Foreign Application Priority Data

Nov. 26, 1999 (GB) .............................. 9928113
Jun. 28, 2000 (GB) .............................. 0015649

(51) Int. Cl.⁷ .............................................. G06T 11/20
(52) U.S. Cl. ...................................... 345/440; 345/441
(58) Field of Search .............................. 345/419, 440, 345/441

(56) References Cited

U.S. PATENT DOCUMENTS

| | | | | | |
|---|---|---|---|---|---|
| 5,228,119 | A | * | 7/1993 | Mihalisin et al. | 345/440 |
| 5,408,596 | A | * | 4/1995 | Nonaka et al. | 345/440 |
| 5,450,326 | A | * | 9/1995 | Black | 345/419 |
| 5,546,516 | A | * | 8/1996 | Austel et al. | 345/440 |
| 5,917,500 | A | | 6/1999 | Johnson et al. | |
| RE36,840 | E | * | 8/2000 | Mihalisin et al. | 345/440 |
| 6,587,108 | B1 | * | 7/2003 | Guerlain et al. | 345/440 |
| 6,704,012 | B1 | * | 3/2004 | Lefave | 345/440 |

FOREIGN PATENT DOCUMENTS

| | | |
|---|---|---|
| EP | 0453817 A | 10/1991 |
| EP | 0753283 A | 1/1997 |

OTHER PUBLICATIONS

Goel, A. et al., "VizCraft: A Multidimensional Visualization Tool for Aircraft Configuration Design", 1999.*
Zinser K: "Integrated Multi Media and Visualisation Techniques for Process S&C" Proceedings of the Interarntional Conference on Systems, Man and Cybernectics, US, New York, IEEE, vol. –, Oct. 17, 1993, pp. 367–372, EP000462477 ISBN: 0–7803–0911–1 Figures 2,4 (To Follow).

* cited by examiner

Primary Examiner—Michael Razavi
Assistant Examiner—Chante Harrison
(74) Attorney, Agent, or Firm—Davis & Bujold, P.L.L.C.

(57) ABSTRACT

Control and output-quality variables of a process plant (1) are plotted against parallel axes in a display unit (7). Convex hulls between pairs of variables are calculated from sets of the variable-values accumulated historically in stores (7, 9) during successive runs of the process, and hulls (HH; TC, BC) between successive axis-pairs are displayed. New variable-values for process optimization are fixed for the variables taken in turn, each selection being made within displayed ranges (Rn—Rn) derived from the hulls effective between the respective variable and the variables already fixed. A display unit (13) provides on-line parallel-axis display of variable-values from the plant (1), showing alarm carets (DC, UC) where values violate limits (UL, LL) determined by the convex hulls, and allowing variation in the displayed-value for observing the resultant effect in avoiding alarm situation and towards optimization.

33 Claims, 13 Drawing Sheets

MULTI-VARIABLE PROCESSES

FIELD OF THE INVENTION

This invention relates to multi-variable processes.

BACKGROUND OF THE INVENTION

The invention is particularly concerned with methods and systems for displaying variables of multi-variable processes.

SUMMARY OF THE INVENTION

According to one aspect of the present invention a method for displaying variables of a multi-variable process, comprises deriving a multi-dimensional display representation in parallel coordinates of a feasible region of the process-variables, the representation being derived from sets of values for the process-variables accumulated respectively from multiple operations of the process, deriving a further set of values for said variables within said region and displaying them within said representation, and defining within the display representation available ranges for the variables according to the values of other variables within said further set.

According to another aspect of the present invention a system for displaying variables of a multi-variable process, comprises means for providing a multi-dimensional display representation in parallel coordinates of a feasible region of the process-variables, the representation being derived from sets of values for the process-variables accumulated respectively from multiple operations of the process, means for deriving a further set of values for said variables within said region and displaying them within said representation, and means for defining within the display representation available ranges for the variables according to the values of other variables within said further set.

The definition of available ranges of the process-variables in the method and system of the invention may be carried out by reference to convex hulls calculated for each pair of variables from the accumulated sets of values. A convex hull in orthogonal coordinates is a closed polygon that encloses all relevant data points of the two-dimensional space, whereas in parallel coordinates it is a pair of spaced linear curves that as between corresponding parallel axes, bound the region occupied by the lines that represent (in the parallel-coordinate space) those data points. A feature of convex hulls used in the present invention is that when the value of one variable is fixed a range of values from maximum to minimum of the other can be derived.

The invention may be applied to monitoring and optimisation of multi-variable processes. More especially, the invention is applicable to ensuring safe and efficient on-line operation of multi-variable processes, in particular by providing a display representation including warning alarm limits on some or all of the variables where these limits are continuously re-calculated in accordance with current operating conditions. Furthermore, the invention is applicable to assist selection of values for the variables of the process and to systems for providing display representations for use in such selection.

According to a feature of the present invention a method for selection of values for variables of a multi-variable process, comprises a first step of deriving a multidimensional display representation in parallel coordinates of a feasible region of the variables, the representation being derived from sets of values for the process-variables accumulated respectively from multiple operations of the process, a second step of selecting, so as to fix, a value within said region for one of said variables and defining available ranges for the other variables in accordance with the selection made, and a third step of selecting, so as to fix, a value within the available range defined for one of the remaining unfixed-value variables and re-defining the available ranges for the other unfixed-value variables in accordance with the selections so far made, this third step being repeated until values for all unfixed-value variables have been fixed by the selections made.

According to another feature of the invention a system for providing a display representation for use in selection of values for variables of a multi-variable process, comprises means storing sets of values for the process-variables accumulated respectively from multiple operations of the process, display means providing a multi-dimensional display representation in parallel coordinates, the representation including in accordance with the stored sets of values, display of a feasible region of the variables, and selection means that is operable successively to select, so as to fix, values within said region for all said variables in turn, said display means being operative upon each operation of the selection means to define available ranges for such of the other variables that remain of un-fixed value.

BRIEF DESCRIPTION OF THE DRAWINGS

A method and system according to the present invention will now be described, by way of example, with reference to the accompanying drawings, in which.

DETAILED DESCRIPTION OF THE INVENTION

The example of method and system to be described is related to the operation of a multi-variable process carried out by a simple, notional processing plant. Details of the plant and its purpose are not of consequence, and indeed the method and system of the invention are related more specifically to operation of the plant as an example of a multi-variable process rather than to the purpose of the process performed, being applicable in the generality to any situation involving a multi-variable process. In the context of description of the present specific example, however, there are fourteen variables involved in plant-operation, and of these, eleven are control variables to the extent that their values determine the outcome of the process. The remaining three variables are quality variables in the sense that their values define, or more especially are defined by, that outcome.

Figure 1:
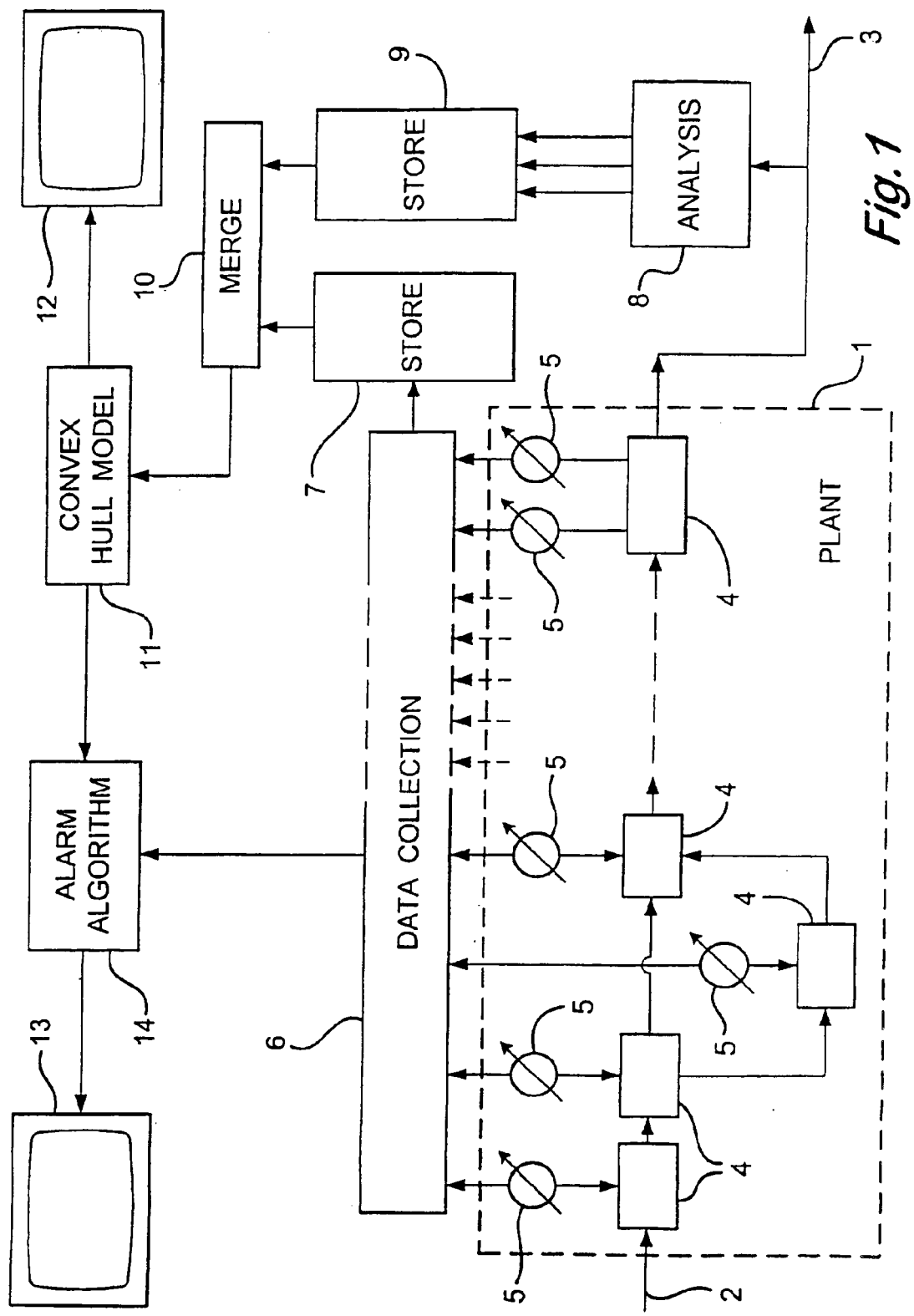
FIG. 1 is a schematic representation of a system according to the invention in the context of collection and utilisation of data derived from operation of a multi-variable processing plant.

Referring to FIG. 1, the plant 1 has an input 2 and an output 3 between which there are a multiplicity of processing stages 4. The processing within each stage 4 is carried out in accordance with one or more variables that, in this example, are regulated by eleven controllers 5. The values of these variables for each operation or 'run' of the process are communicated to a data collection unit 6 to be accumulated in a store 7. The term 'run' in this context may refer to a discrete operation of the process, but it may also refer to what applies at a discrete point in time within continuous operation.

The outcome at the output 3 of each run of the process, is submitted to a unit 8 for analysis in respect of its quality as determined according to three variables. The values of these three quality variables are accumulated in a store 9, so that each run of the process and its outcome is defined by an accumulated set of fourteen values, eleven in the store 7 and three in the store 9, for the fourteen variables respectively.

As the process is run again and again, a multiplicity of different sets of fourteen values are accumulated to provide a historical record in the stores 7 and 9 of the successive runs. This record is used in the method of the present invention to assist selection of the values of the various variables appropriate to achieving a particular outcome. More especially, the fourteen values of each individual set, eleven in the store 7 and three in the store 9, are brought together in a merge unit 10 and each scaled to the range 0 to 1. The scaled values are then processed in a unit 11 according to a convex-hull model to plot them in an electronic display unit 12. The scaled values of each set are plotted in fourteen-dimensional space using a system of parallel coordinates as illustrated in FIG. 2.

Figure 2:
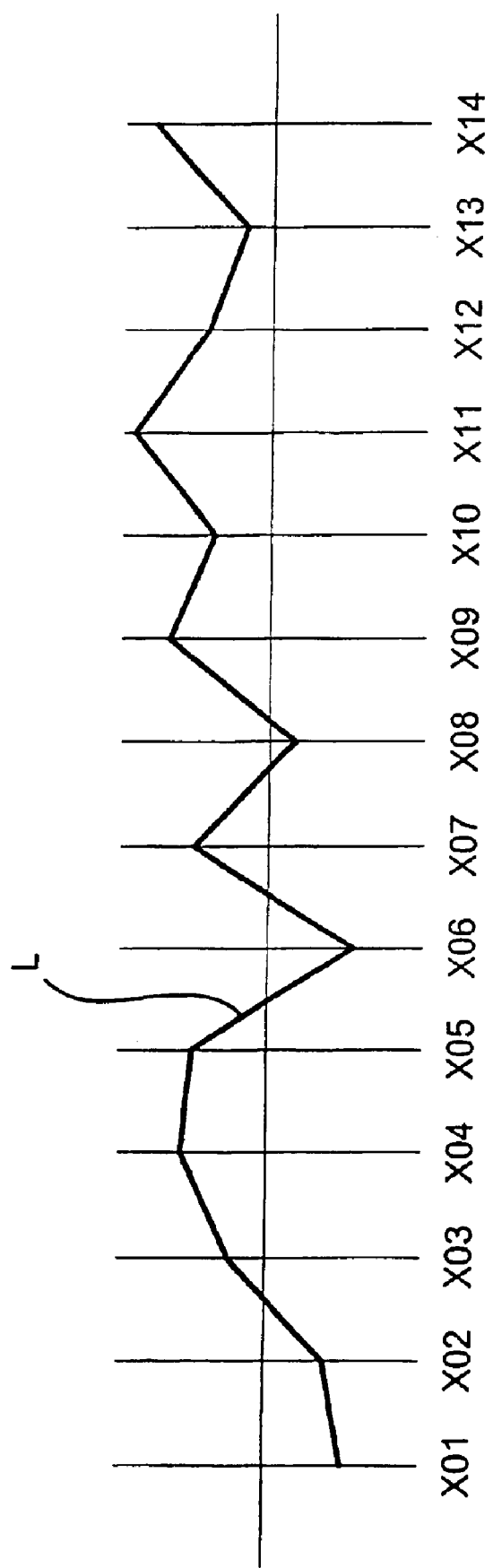
FIG. 2 is illustrative of a plot in multidimensional space defined by parallel coordinate axes, of operation of the multi-variable processing plant of FIG. 1.

Referring to FIG. 2, the fourteen values are plotted on fourteen equally-spaced, parallel axes X01–X14 representing the fourteen variables respectively. The first three, axes, X01–X03, are used for the quality variables, and the plots are joined up to form a polygonal line L that is representative of the single fourteen-value operating point of the process. The other sets of process-values are each correspondingly plotted against the same axes X01–X14 resulting in a multiplicity of polygonal lines corresponding to the line L; this is illustrated in part in FIG. 3. Each polygonal line is representative of an individual operating point or run of the process from the historical record.

Figure 3:
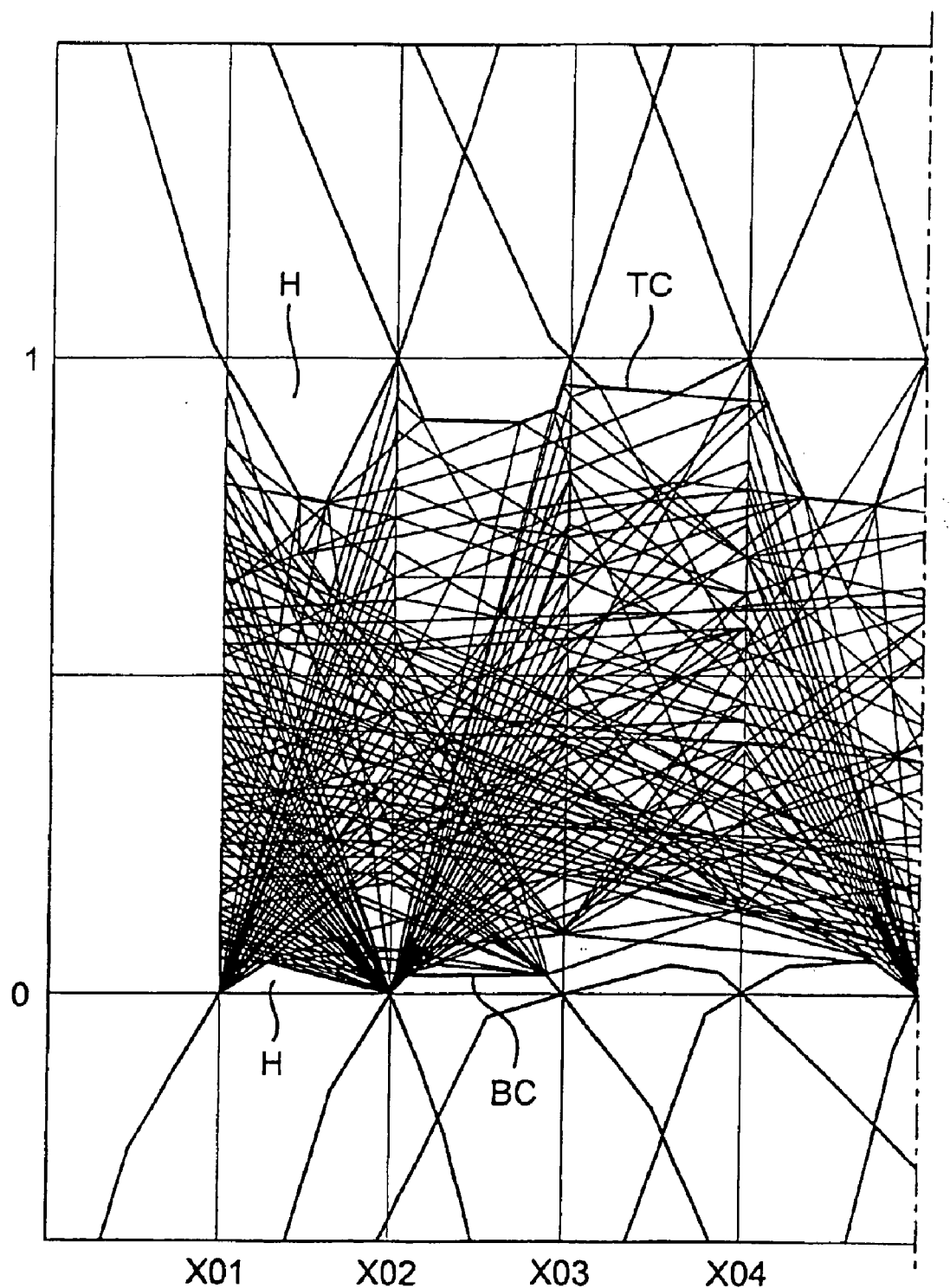
FIG. 3 shows in part a multiplicity of plots corresponding to that of FIG. 2 resulting from variation of operation of the multi-variable process.

Referring further to FIG. 3, convex hulls H for all pairs of adjacent variables of the parallel-axis system, are calculated in the unit 11 and displayed. Between each pair of adjacent axes X01–X14 there will be an upper and lower hull H defining upper and lower limiting boundaries between those two axes, of the operating-point lines. The upper and lower hulls H of the successive pairs of adjacent axes join together to define top and bottom boundaries or chains TC and BC respectively. Calculation of the convex hulls applicable to all the other pairings of variables is also made, but are not displayed in display unit 12.

Figure 4:
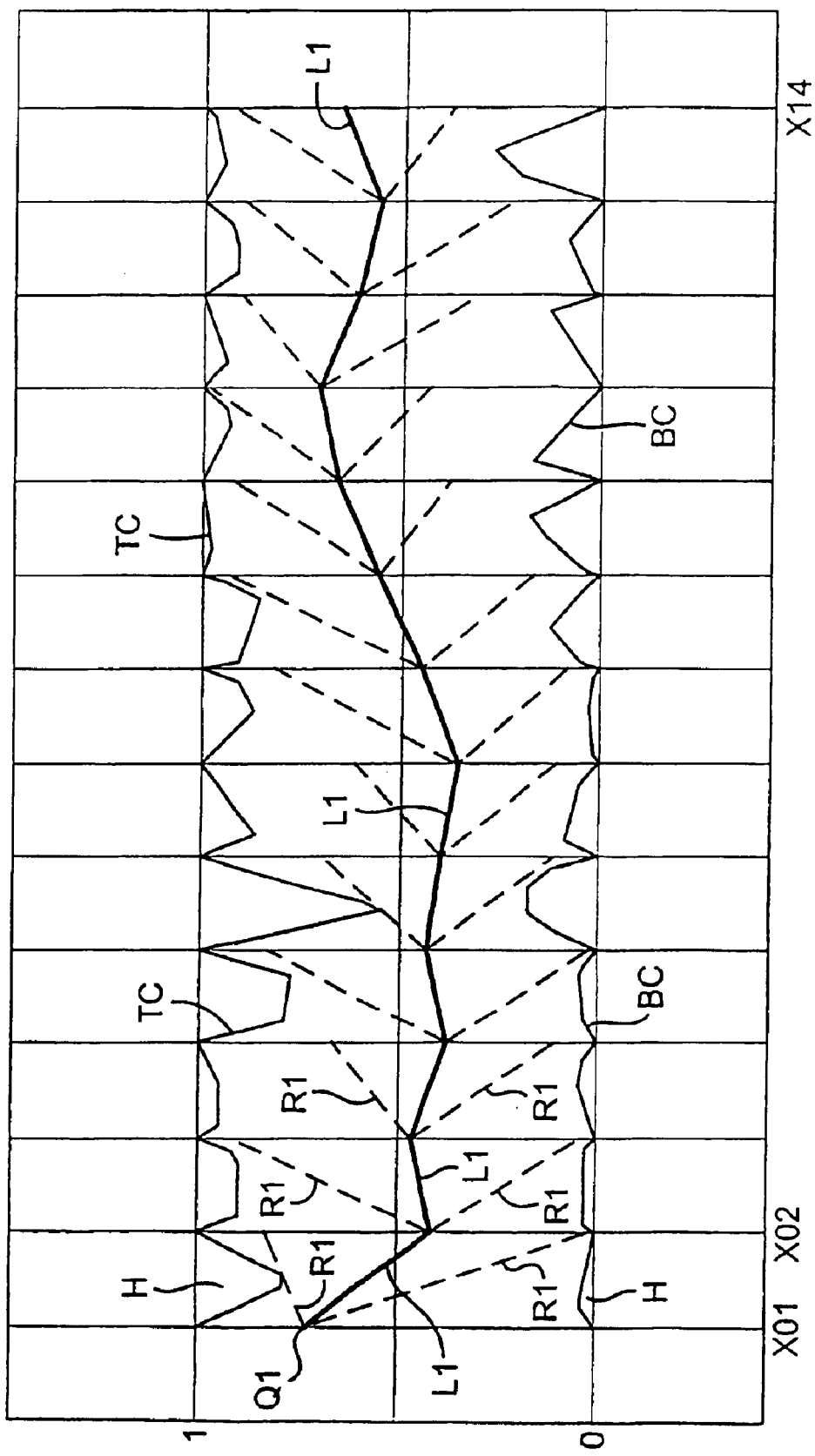
FIGS. 4 to 6 are illustrative of displays provided during successive stages of the method according to the invention, for assisting with selection of values for the variables of operation of the processing plant of FIG. 1.

Once the calculation of all the convex hulls has been completed, a display as shown in FIG. 4 is provided in which the upper and lower hulls H are restricted for simplicity to those parts lying within the range 0 and 1. In this way, the upper and lower hulls H are seen more clearly as joining up together as top and bottom chains TC and BC respectively, defining (for example, in colour red) the upper and lower boundaries of a region within which feasible operation of the process can take place. Clearly, the larger the number of historical sets of operational data used, with as wide as possible range of values for the individual variables, the more accurately will this region, be defined.

It is optional whether representation in the form of FIG. 3 is provided by the display unit 12, but representation in the form of FIG. 4 is displayed and utilised for the selection of the process-variables to be used in optimum, or otherwise, operation of the process. The steps of selection begin with fixing the first variable, that is to say, the variable of axis X01. This is a quality variable and the selection made establishes the value, Q1, this variable is to have in the outcome of the prospective process-run. The selection may be made by moving a cursor up the axis X01 in the display using a mouse (not shown), and clicking at the appropriate position.

The selection of the value Q1 of the first variable, brings about display of a polygonal line L1 (for example in colour blue) representing the operating point that would result in the event that the other thirteen variables were each fixed at the midpoints of their available ranges. In this regard, a calculation is made for each of these unfixed variables of the restricted range of values which is open for selection in respect of that variable as a consequence of the selection of value Q1 for the first variable. The range is derived in each case by reference to the convex hull between the fixed first variable and the unfixed variable. These ranges are denoted in the display for each unfixed variable by the intersection with its respective axis X02–X14 of two lines R1 (for example in colour green) that diverge from the immediately preceding axis X01–X13; the lines R1 are tangential to the convex hull between the fixed first variable and the unfixed variable. The lines R1 that intersect the axis X02 of the second variable diverge from the selected value Q1 on the axis X01, whereas in each other case (for the variables of axes X03–X14) they diverge from the mid-point of the available range of the variable of the immediately preceding axis X02–X13. It is this mid-point that is assumed selected for each of the unfixed variables, in the plotting of the line L1.

Figure 5:
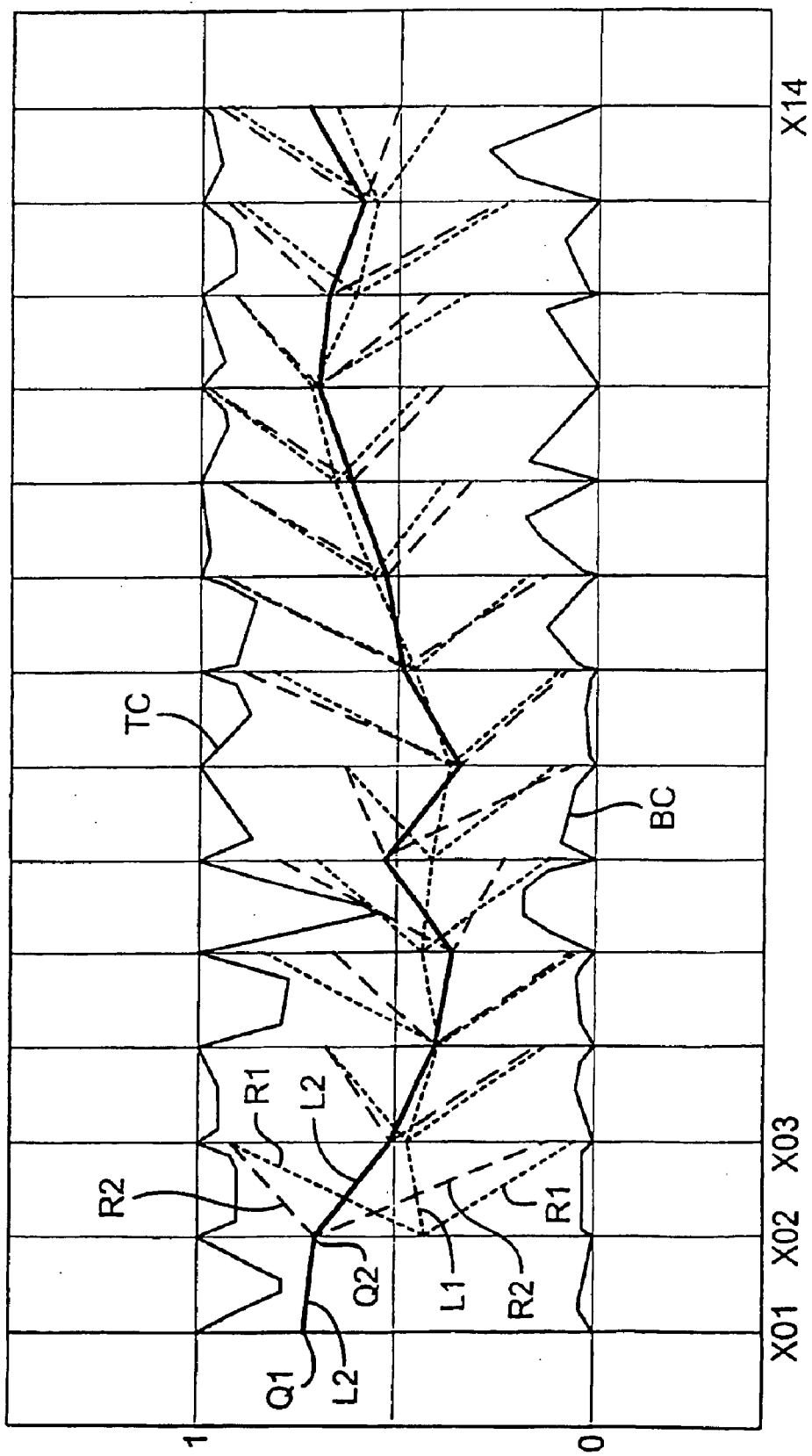

The next step is the selection of the value Q2 of the variable of the second axis X02. Selection is made by moving the cursor up the axis X02 and clicking the mouse at the appropriate position, and has the effect of changing the display to that shown in FIG. 5. A new line L2 is displayed joining the fixed points Q1 and Q2 between axes X01 and X02 and extending from point Q2 through the mid-points of the available ranges of the other twelve, unfixed variables. These available ranges, which are denoted by divergent lines R2 (for example in colour green), are each derived by reference to the overlap with the range previously calculated for the fixed value Q1 and denoted by lines R1. The available range defined for each unfixed variable by the lines R2 is restricted by virtue of the overlap to the range of values of that variable which is available for selection having regard to both selected values Q1 and Q2. The lines R1 and L1 may, as indicated in FIG. 5, be retained in the display (but for example now in colour grey) for reference purposes to indicate the range available for each unfixed variable before selection of value Q2, and the previous course of the line L1 from the axis X02.

The selection method now proceeds to the step of selecting in a similar way the value Q3 of the third variable (axis X03), and then on from there through successive steps until the values Q4–Q14 of all the remaining variables have been selected to complete definition of the value-set for the desired operating point. The display changes as the selections are made, and for example appears as in FIG. 6 when the values Q1–Q5 of the first five variables have been selected. In this case, lines R5 identify the available ranges for the remaining variables of axes X06–X14, and lines R4 show the ranges available immediately before the value Q5 was selected. The polygonal line L5 interconnects the already-selected values Q1–Q5 and the mid-point values of the available ranges of the remaining unfixed variables, whereas line L4 shows its previous course from axis X05.

As each individual selection is made to fix the value Qn of the next unfixed variable (in the order of the axes X01–X14); so the restricted range due to each already-fixed variable is calculated using the relevant convex hull between those fixed and unfixed variables. The available range is displayed for each unfixed variable using, lines Rn. The lines Rn define the available range of each unfixed variable as the portion of the relevant axis X which is common to (overlapped by) the restricted ranges derived for that variable and each of the fixed variables. The polygonal line Ln is established passing through all the values Q selected for the currently-fixed variables and also through the mid-points of the available ranges of the unfixed variables.

The polygonal line Ln connects the fixed values of the fixed variables and the working (or suggested) values of the unfixed variables. To ensure that the line Ln always represents a feasible operating point of the process, the working values of the unfixed variables apart from that to the immediate right of the last fixed variable, are calculated using a more restricted range than that displayed. In this regard, the range due to the fixed variables is overlapped with the ranges due to the working values of all the unfixed variables to the left of the one whose working value is being calculated to give the working range, and the mid-point of this range is taken as the working value. These working ranges may be optionally displayed in a different colour from the ranges due to the fixed variables.

Figure 6:
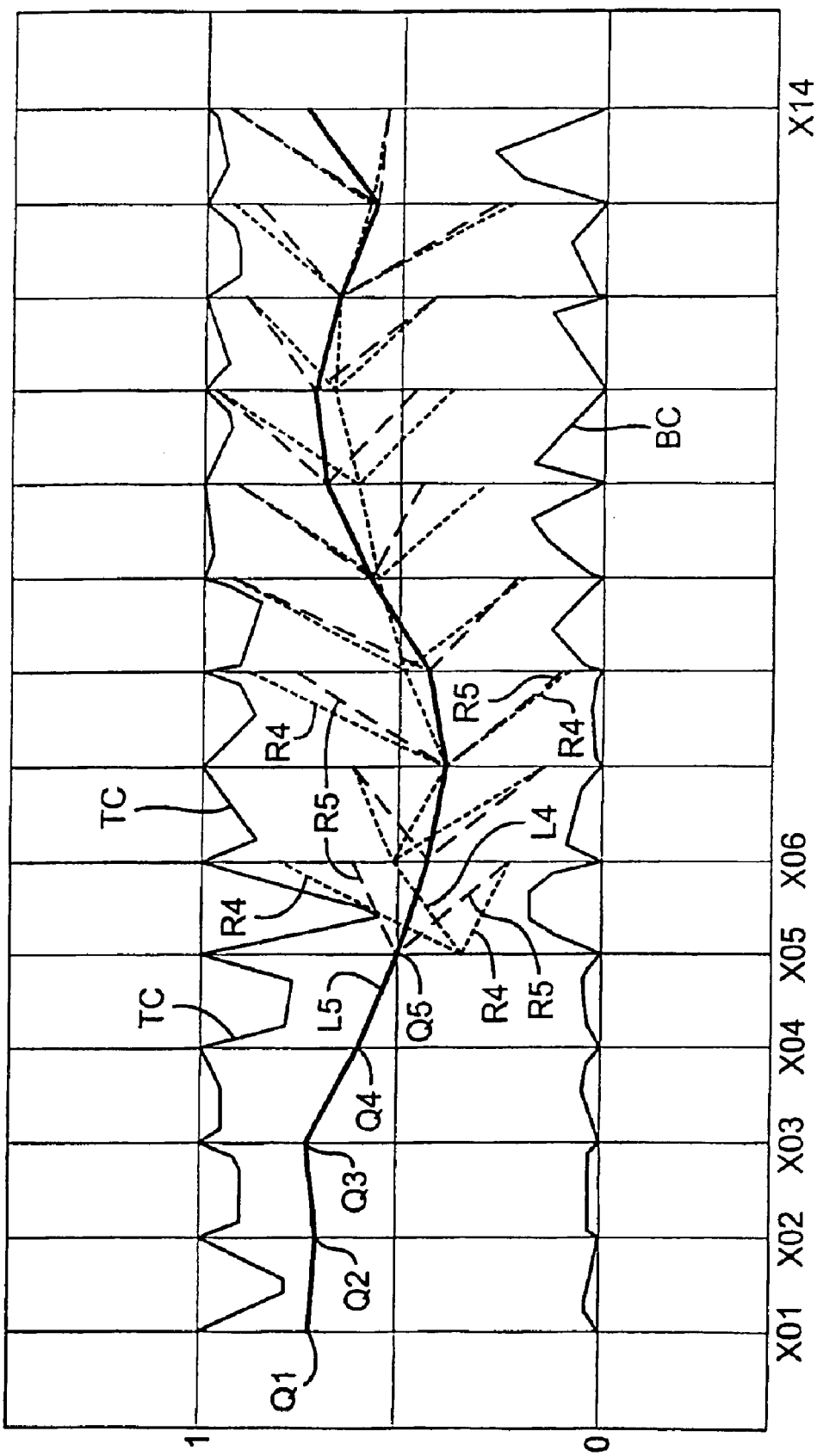

Throughout the method of the invention as the display progresses step-by-step from that of FIG. 4 to that of FIGS. 5 and 6, and so on until all selections have been made, the operator is presented with information that enables selection of feasible values of the variables consistent with desired objectives of economy, efficiency and outcome of the process. The information is derived without the need to fit a functional model to the historical data and the disadvantages associated with this, and is applicable to adjustment or re-setting of the controllers 5 of the plant 1 for optimisation of plant-operation.

The values of the variables that have been fixed in the display of unit 12 can be changed. This enables the operator to search for sets of values that give the 'best' ranges for the unfixed variables, and in this regard the 'best' range in any particular case may simply be a narrow range about a desired value. The limits within which each fixed variable can be moved while holding the other fixed variables constant, are calculated using the convex hulls between the fixed variables, and are included in the display. This display changes continuously as the fixed variable is changed.

These characteristics of the display may be used with particular advantage if the controllable variables are fixed and arranged to the left of all the quality variables. The controllable variables can then be moved until satisfactory values of the quality variables are obtained.

The latter functionality of the display is illustrated in the example of FIGS. 7 to 10. In this example, variables p11, p12, p13 and p14 are considered to be 'process' variables which can be manipulated, and variables q7 and q8 are considered to be 'quality' variables which depend on the process variables.

Figure 7:
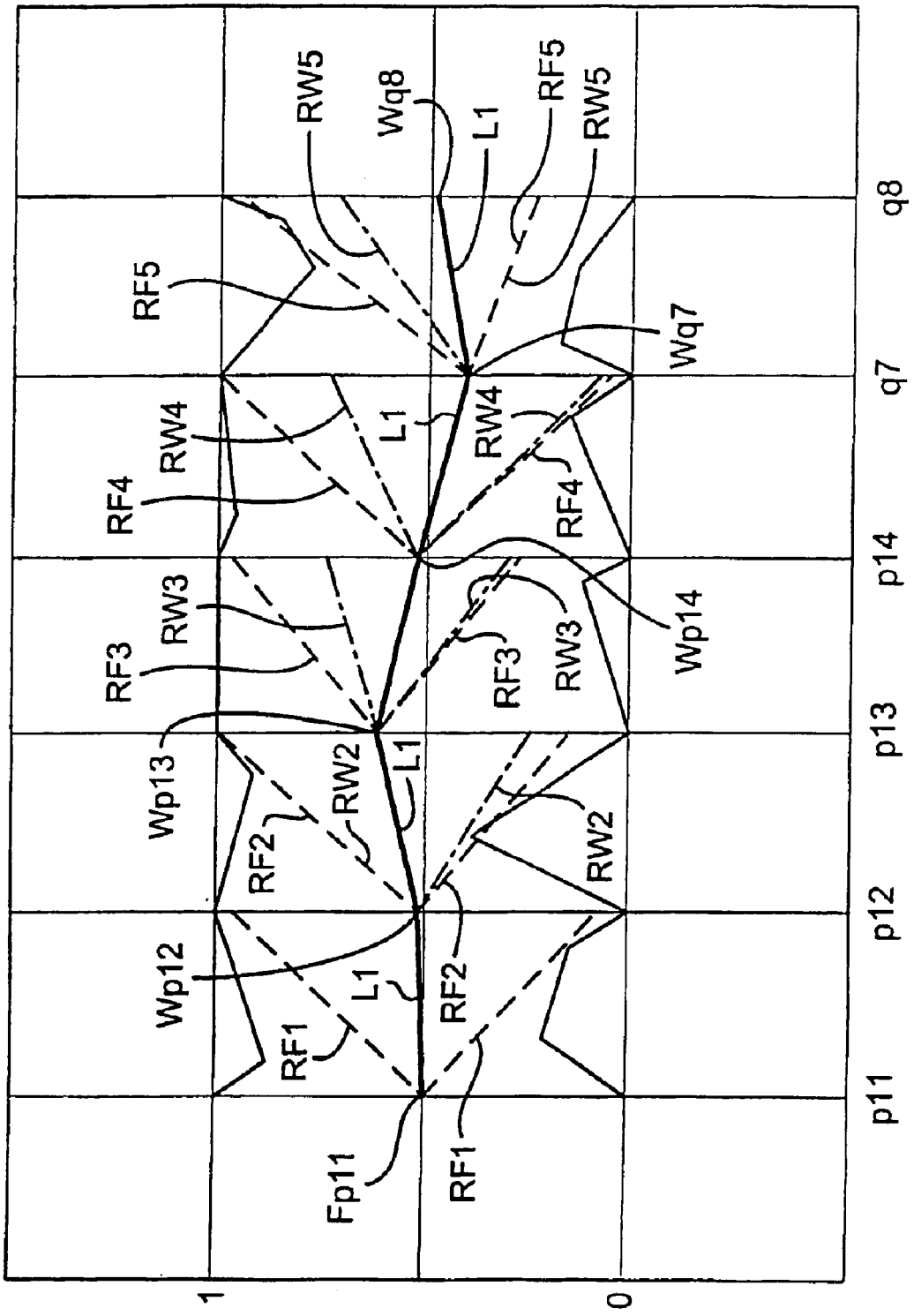
FIGS. 7 to 10 are illustrative of further displays provided according to the invention to assist further in selection of values for variables of operation of the processing plant of FIG. 1.

In FIG. 7, point Fp11 is the value to which the variable p11 has been set, and points Wp12 to Wp14 and Wq7 and Wq8 are the working values of variables p12 to p14 and q7 and q8 respectively. These points are joined by a polygonal line L1, and line-pairs RF1 to RF5 display the ranges of the respective variables p12 to p14 and q7 and q8, that are due to variable p11 having the value Fp 11. The range in each case is shown by the intercept the line-pair makes with the axis of the relevant variable.

A line-pair RW2 (the upper line of which is co-linear with the upper line of the line-pair RF2) show by their intercepts on the axis p13 the range of variable p13 that is due to variable p11 having the value Fp11 and the variable p12 having the value Wp12. The value Wp13 is the mid-point of this range. Similarly, a line-pair RW3 displays the range of variable p14 that is due to variables p11, p12 and p13 having the values Fp11, Wp12 and Wp13 respectively, and value Wp14 is the mid-point of this range. Line-pairs RW4 and RW5 correspondingly display ranges, with mid-points Wq7 and Wq8, of the variables q7 and q8 that are due respectively to the values set for the four variables p11 to p14, and the five variables p11 to p14 and q7.

Figure 8:
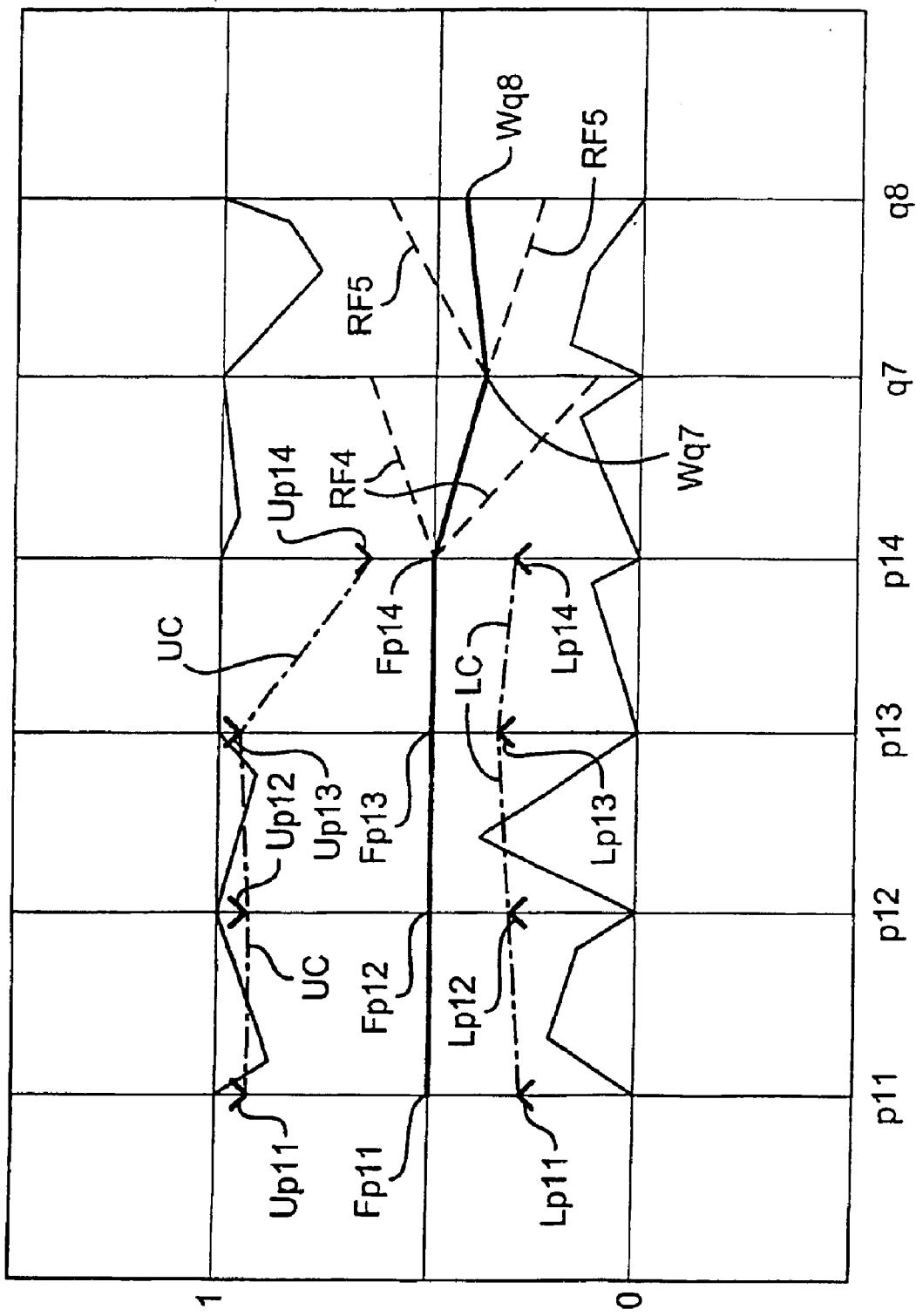

FIG. 8, illustrates the display that results from now setting the variables p11 to p14 to the values Fp11 to Fp14 respectively. Carets at Up11 and Lp11 indicate the calculated limits (as referred to above) between which the value of variable p11 may be moved while holding variables p12, p13 and p14 at values Wp12, Wp13 and Wp14 respectively. Similarly, carets at Up12 and Lp12 indicate the limits between which the variable p12 may be moved while holding variable p11 at value Fp11, variable p13 at value Fp13, and variable p14 at value Fp14. Carets Up 13 and Lp14 and Up14 and Lp14 are correspondingly provided for the variables p13 and p14, and the upper carets Up11 to Up14 are joined by polygonal line UC and the lower carets Lp11 to Lp14 by polygonal line LC.

Figure 9:
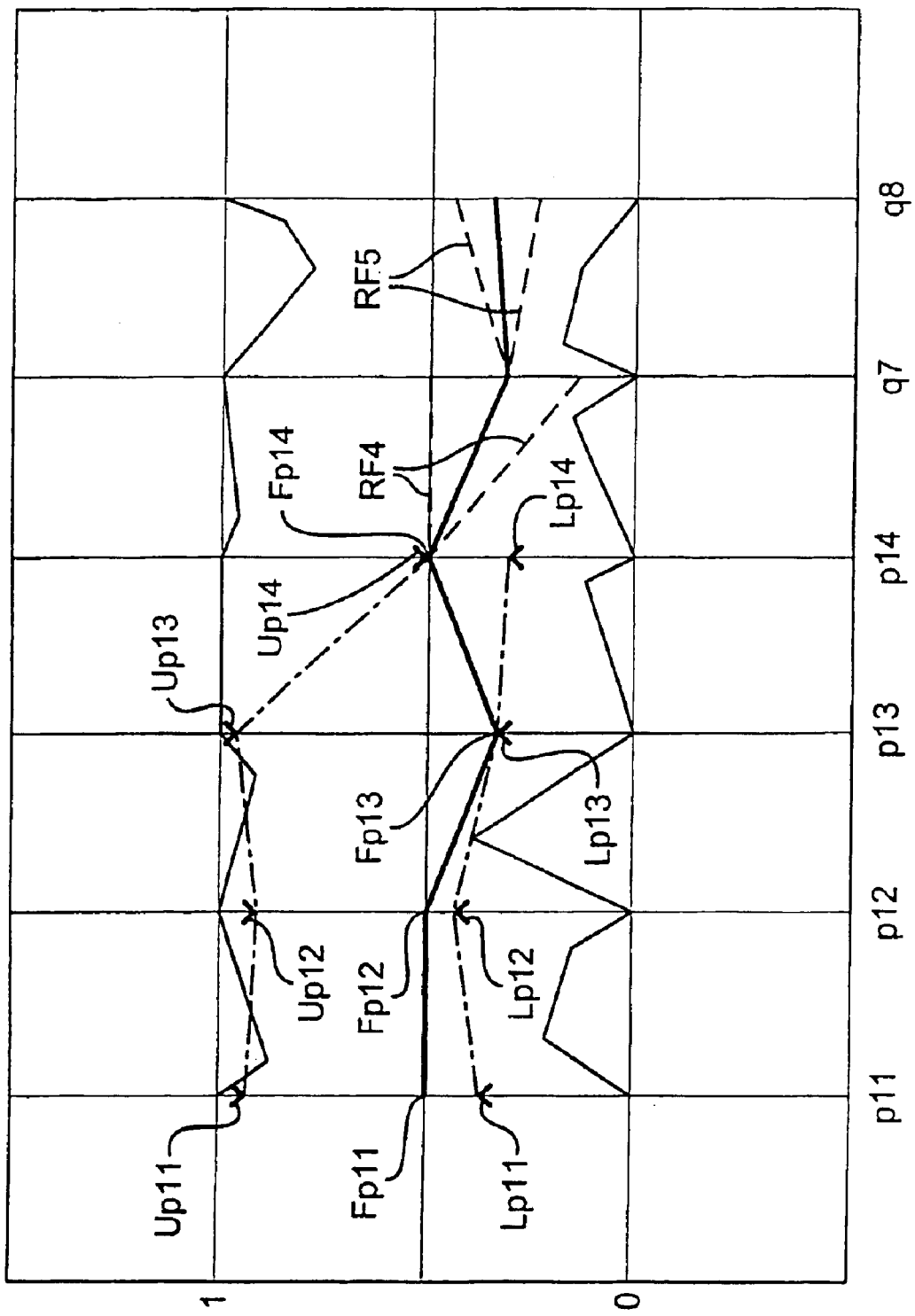

FIG. 9 illustrates the effect of moving the point Fp13 to the current lower limit represented by caret Lpl3. The limits represented by the other carets have in general changed, and so too have the ranges of variables q7 and qB represented by the line-pairs RF4 and RF5. In particular, the upper limit of variable p14 represented by caret Upl4, has moved down to the current value Fp14, indicating that the convex hull between axes p13 and p14 is setting the most restrictive lower limit on variable p13.

Figure 10:
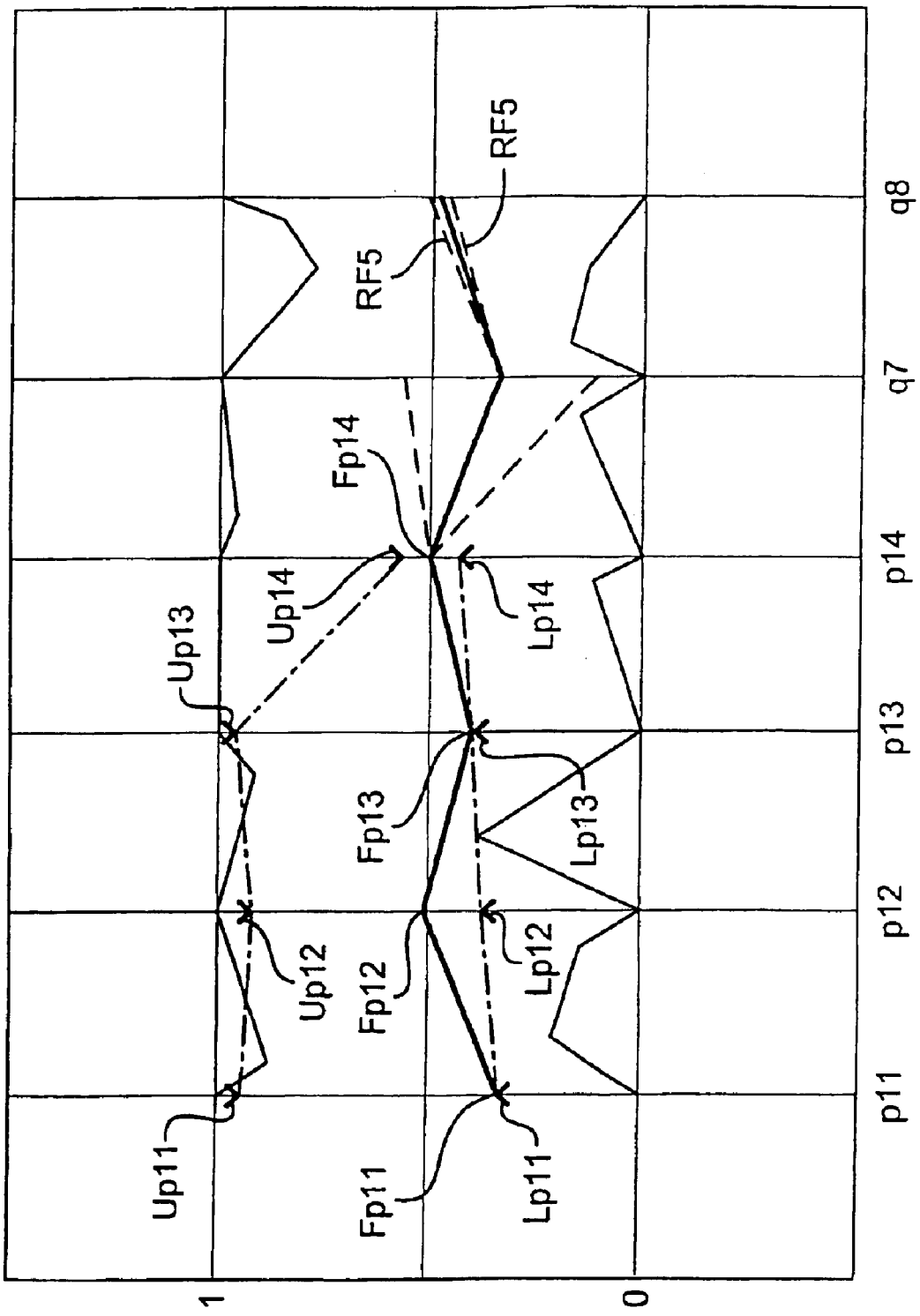

FIG. 10 illustrates the situation when the user, by experimenting with the values of variables p11 to p14, has discovered settings for these variables which keep the value of variable q8 within a narrow range near the value 0.5, as evidenced by the intercepts of both lines RF5 with the axis of variable q8, close to this value.

The display techniques described above may be used to determine appropriate warning alarm levels on plant variables during process operation, and to display those alarm levels and the current values of the corresponding variables to the processing operator. This is achieved as illustrated in FIG. 1, using a further electronic display unit 13. The display unit 13 is driven from an alarm-algorithm unit 14 in accordance with data from the unit 11 and the values of the process variables in real time, supplied from the unit 6. All the variables are treated as of fixed value.

Whenever a new set of values for the process variables is received from the unit 6, the unit 14 identifies which variables have values lying in the 'best-operating' zone or region defined between the relevant top and bottom chains of convex hulls. Upper and lower limits for all variables are calculated from these values within the best-operating zone using the relevant convex hull as for the display of unit 12. Furthermore, the unit 14 identifies which, if any, of the variables have values that lie outside these limits, and gives warning by indication in the display of unit 13 or otherwise, of the condition. As each new set of values is received, the display changes, and the limits on all the variables are recalculated and shown in the display of unit 13, exactly as if the point had been moved by the program-user in offline operation. The quality variables are treated no differently from the control variables in determining the on-line alarm limits.

In this way the display unit 13 provides representation of warning alarm limits for all variables simultaneously. These limits are always calculated using the current values of all the other variables; no model-fitting or statistical assumptions are required.

Figure 11:
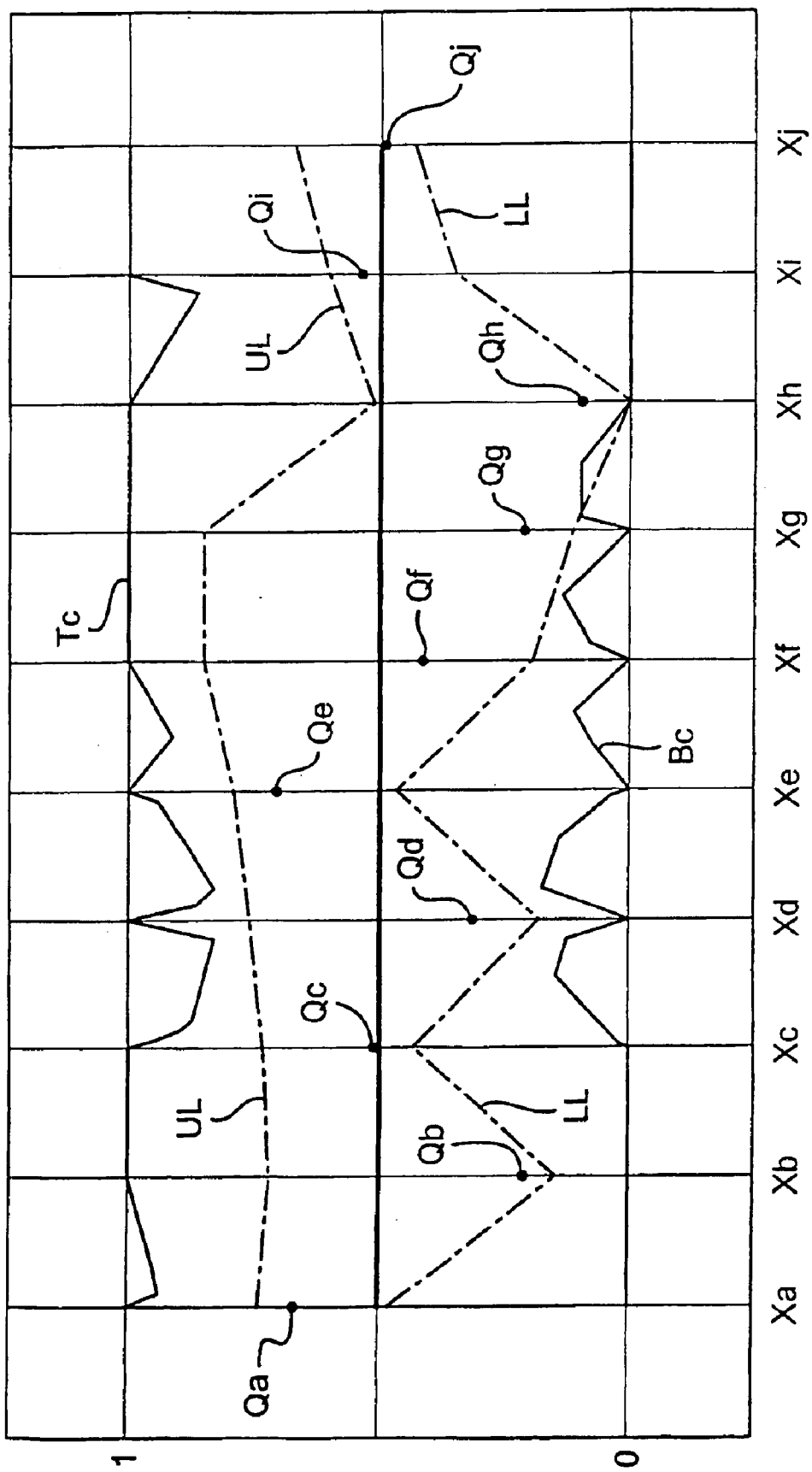
FIGS. 11 to 13 are illustrative of displays derived in varying circumstances during on-line monitoring of operation of the processing plant of FIG. 1.
Figure 12:
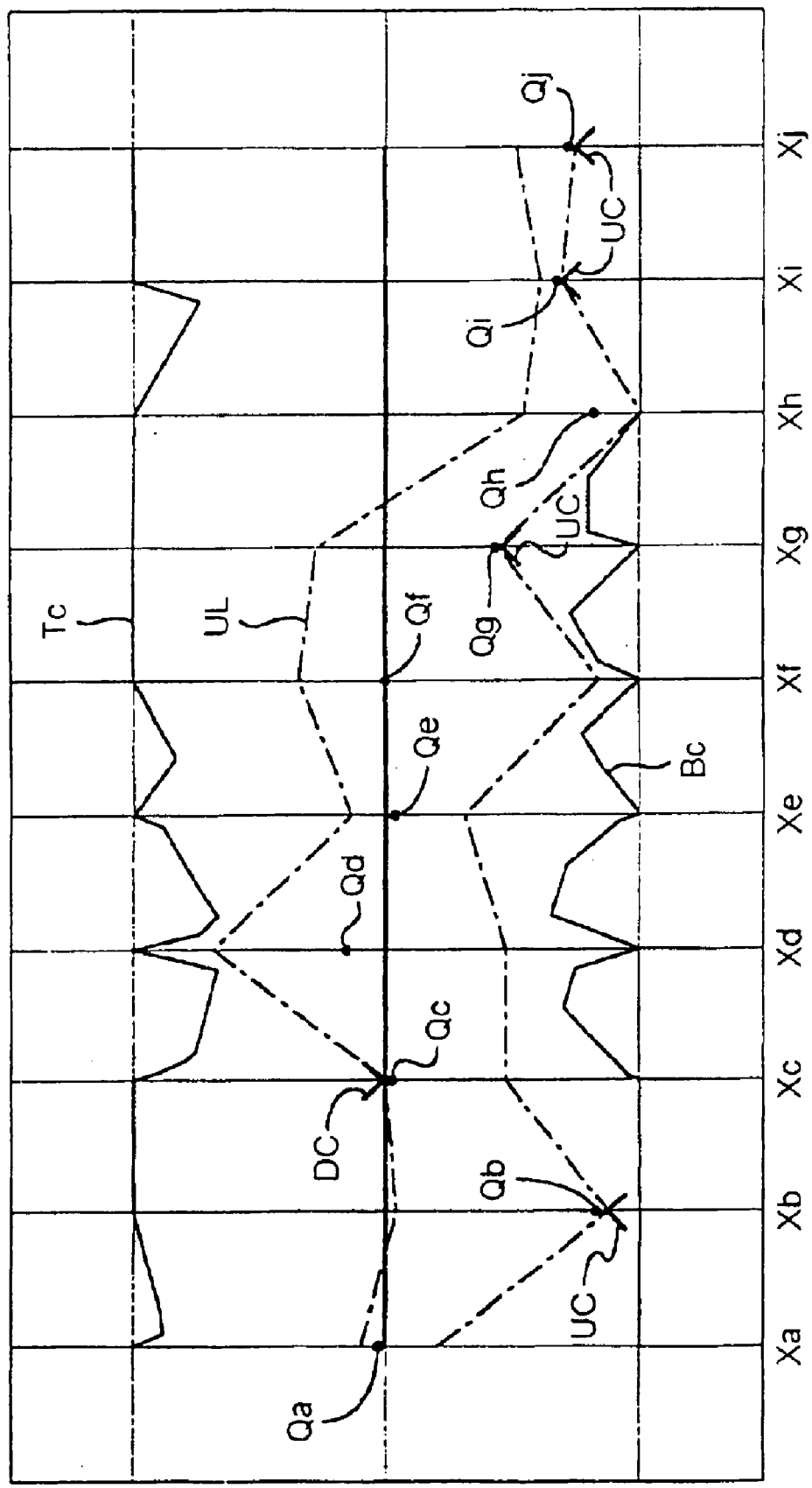
Figure 13:
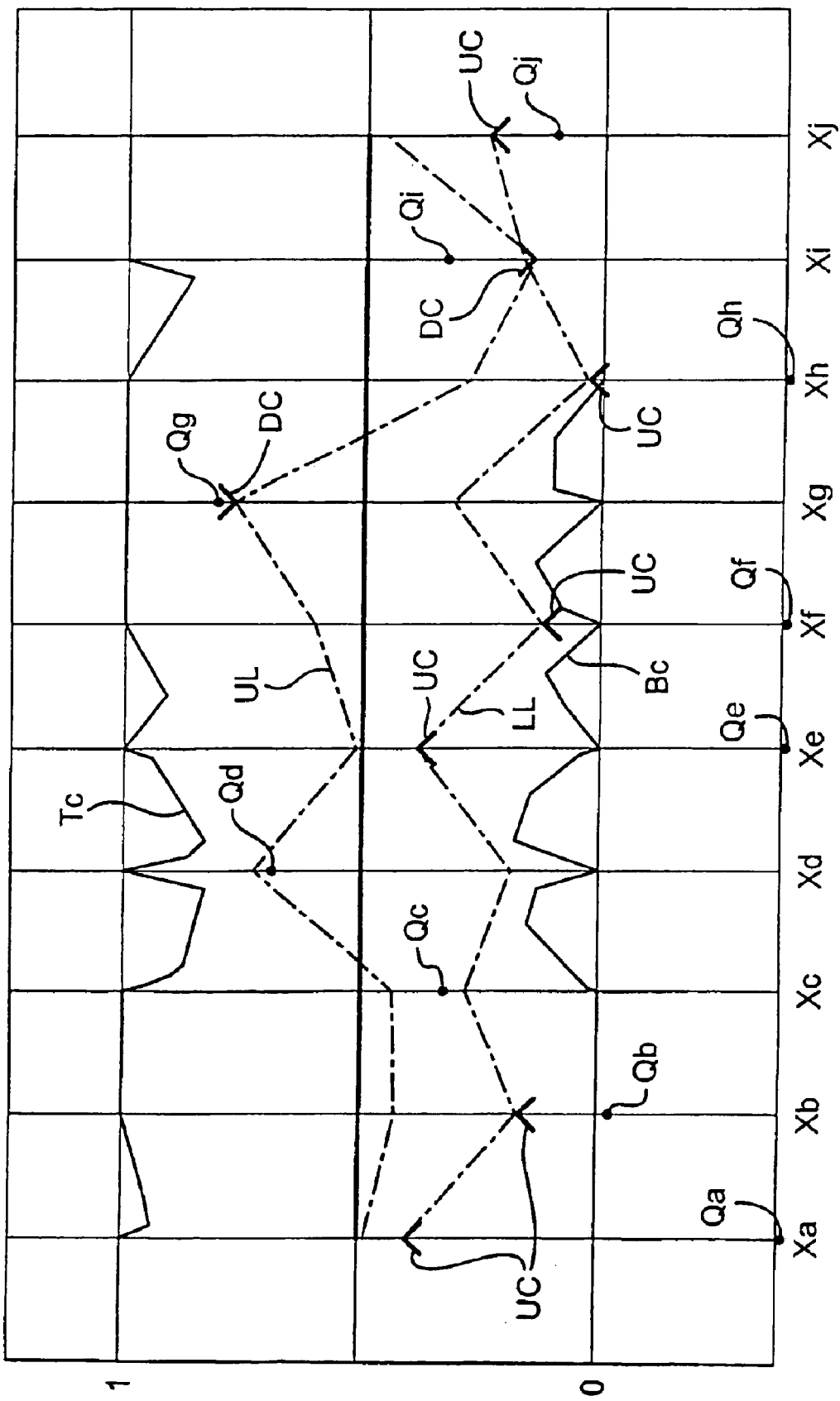

Displays provided by the unit 13 in three different circumstances are illustrated in FIGS. 11 to 13, for ten variables plotted against axes Xa–Xj.

Referring to FIG. 11, the plotted values Qa to Qj are all within the current best-operating zone defined between top and bottom chains Tc and Bc respectively. Upper and lower current limits calculated for the individual variables and plotted on the respective axes Xa–Xj are joined up to provide polygonal lines UL and LL. The lines UL and LL define the zone within which the values of the variables are to be retained. In this example, all values Qa to Qj are within the zone, but this is not so in the circumstances of the displays illustrated in FIGS. 12 and 13.

In the circumstances of the display of FIG. 12, the value Qc for the variable plotted on the axis Xc is on the upper limit UL, and the values Qb, Qg, Qi and Qj for the variables plotted on axes Xb, Xg, Xi and Xj respectively, are on the lower limit LL. On the other hand, in the circumstances of the display of FIG. 13, the values Qc and Qd of the variables plotted on axes Xc and Xd, are the only ones within the best-operating zone between the limit lines UL and LL. In both cases, as illustrated in FIGS. 12 and 13, a caret (for example of colour red) is included in the display where a variable-value is on the boundary or outside the best-operating zone. More particularly, a downwardly-directed caret DC is displayed on the relevant axis of any variable where the value is on or above the line UL and an upwardly-directed caret UC is correspondingly displayed where the value is on or below the line LL.

The process operator can interact with the display unit 13 to adjust one or more of the fixed values Qa–Qj up or down their respective axes experimentally, to see the effect this has on the limits of the other variables. When an alarm condition exists, and several variables are on or beyond their limits, adjusting the value Q of even one of them may be found to move the limit lines UL and LL outwardly from one another sufficiently to relieve the alarm condition on the others.

Accordingly, by using the on-line display of unit 13, the operator can not only monitor the current settings and results of the process, but can also be made aware of alarm situations and receive guidance in focussed investigation of the remedial action necessary.

What is claimed is:

1. A method for displaying process-variables of a multi-variable process, comprising the steps of accumulating a multiplicity of data-sets during multiple runs of the process, each data-set comprising values of the process-variables in an individual one of the multiple runs, deriving a multi-dimensional graphic display representation of a feasible region of the process-variables, the multi-dimensional graphic display representation being derived from the accumulated data-sets of values for the process-variables, deriving a further set of values for the process-variables within the region and displaying them graphically within the graphic display representation, and defining within the graphic display representation available ranges for the process-variables according to the values of other process-variables within the further set of values, the graphic display representation comprising a multiplicity of mutually-spaced coordinate axes which are identified individually in the graphic display representation with respective ones of the process-variables, and the feasible region being defined as an area of the graphic display representation between upper and lower boundaries extending through the coordinate axes, the upper and lower boundaries being derived in accordance with bounds of value that exist between the process-variables in the accumulated data-sets.

2. The method according to claim 1, wherein the available ranges are defined for each of the process-variables by convex hulls between that individual process-variable and each other process-variable, each of the convex hulls being calculated as a bound applicable as between that individual process-variable and another process-variable within the accumulated data-sets.

3. The method according to claim 2, wherein the process-variables are related in ordered sequence to respective axes of a set of parallel coordinate axes of the multi-dimensional graphic display representation, and convex hulls for the successive pairs of process-variables in the ordered sequence are displayed between the axes identified individually with the process-variables of that respective pair of process-variables in the multi-dimensional graphic display representation, each of the convex hulls being indicative of a bound applicable as between the process-variables of the respective pair within the accumulated data-sets.

4. The method according to claim 2, wherein the values of the further set of values of the process-variables are derived selectively and sequentially with one another, and the available ranges for the process-variables are defined and re-defined according to the selections made.

5. The method according to claim 2 performed during running of the process, wherein the values of the further set of process-variables are the current values of the process-variables during that run, and alarm indication is provided in respect of any of the process-variables for which the current value is outside the available range for that process-variable.

6. The method according to claim 5, wherein the alarm indication includes the display of an alarm marking against the available range violated.

7. A method for selection of values for process-variables of a multi-variable process, comprising a first step of deriving a multi-dimensional graphic display representation of a feasible region of the process-variables, the multi-dimensional graphic display representation comprising a multiplicity of mutually-spaced coordinate axes which are identified individually with respective ones of the process-variables, the first step including accumulating a multiplicity of data-sets during multiple runs of the process, each data-set comprising the values of the process-variables in an individual one of the multiple runs of the process, a second step of selecting, so as to fix, a value within the region for one of the process-variables the step of selecting a value for the one process-variable being carried out by selecting a position along the axis which is identified individually with that one process-variable within the multiplicity of mutually-spaced coordinate axes, and the second step including defining available ranges for the other process-variables in accordance with the selection made, and a third step of selecting, so as to fix, a value within the available range defined for one of the remaining unfixed-value process-variables, the third step including re-defining the available ranges for the other unfixed-value process-variables in accordance with the selections so far made, this third step being repeated until values for all unfixed-value process-variables have been fixed by the selections made.

8. The method according to claim of 7, wherein the available ranges are defined for each process-variable by convex hulls between that individual process-variable and each other process-variable, each convex hull being calculated as a bound applicable as between that individual process-variable and another process-variable within the accumulated data-sets.

9. The method according to claim 8, wherein the process-variables are related in ordered sequence to respective axes of a set of parallel coordinate axes of the multidimensional graphic display representation, and convex hulls for the successive pairs of process-variables in the ordered sequence are displayed between the axes identified individually with the process-variables of that respective pair of process-variables in the multi-dimensional graphic display representation, each convex hull being indicative of a bound applicable as between the process-variables of the respective pair within the accumulated data-sets.

10. The method according to claim 9, wherein the value of the one process-variable is selected by selecting a position corresponding to that value along the first axis of the set of parallel coordinate axes, and the multi-dimensional graphic display representation includes display of a polygonal line that extends from the selected position to intersect each individual axis of the other axes of the set of parallel coordinate axes, the polygonal line intersecting each individual axis of the other axes of the set of parallel coordinate axes at a position corresponding to the mid-point of a working range of the process-variable with which that individual axis is identified, the working range lying within the available range defined for that process-variable.

11. The method according to claim 10, wherein the third step includes the display of a new polygonal line in the multi-dimensional graphic display representation as the value of each successive process-variable is fixed by selection, the new line extending through positions which on the respective axes identified with the fixed-value process-variables correspond to the values selected, and which on the respective axes identified with the unfixed-value process-variables correspond to the mid-points of working ranges that lie within the available ranges of those unfixed-value process-variables.

12. The method according to claim 11, wherein the available range for each unfixed-value process-variable is displayed on the axis identified with that process-variable by an intercept therewith of divergent lines from the immediately preceding axis in the ordered sequence of axes.

13. The method according to claim 8, wherein the re-definition of available ranges in the third step is effected in dependence upon the convex hulls which are applicable individually between the remaining process-variables of unfixed value and each of the fixed-value process-variables.

14. The method according to claim 7, wherein the multi-dimensional graphic display representation includes graphic display in respect of each of a plurality of the fixed-value process-variables, of a range within which the value of that process-variable may be changed while holding the others of the plurality of fixed-value process-variables at their fixed values.

15. The method according to claim 7, wherein a further multi-dimensional graphic display representation is provided during running of the process, the further multi-dimensional graphic representation displaying the values of the process-variables that are current during that run and providing alarm indication in respect of any process-variable for which the current value is outside current limits for that process-variable, the current limits being dependent upon the current values of the other process-variables and are calculated in accordance with the accumulated data-sets.

16. The method according to claim 15, wherein the current limits are displayed in the further display representation, and the alarm indication includes the display of an alarm marking against a current limit violated.

17. A system for displaying variables of a multi-variable process, comprising means for accumulating a multiplicity of data-sets during multiple runs of the process, each of the data-sets comprising the values of the process-variables in an individual one of the multiple runs, means for providing a multi-dimensional graphic display representation of a feasible region of the process-variables, the multi-dimensional graphic display representation being derived from the accumulated data-sets of values for the process-variables, means for deriving a further set of values for the process-variables within the region and displaying them graphically within the graphic display representation, and means for defining within the graphic display representation available ranges for the process-variables according to the values of other process-variables within the further set of values, the graphic display representation comprising a multiplicity of mutually-spaced coordinate axes which are identified individually in the graphic display representation with respective ones of the process-variables, and the feasible region being defined as an area of the graphic display representation between upper and lower boundaries extending through the coordinate axes, the upper and lower boundaries being derived in accordance with bounds of value that exist between the process-variables in the accumulated data-sets.

18. The system according to claim 17, wherein the means for defining the available ranges is operative to define those ranges in terms of convex hulls that are calculated for each pair of process-variables from the accumulated data-sets.

19. The system according to claim 18, wherein the means for providing the multi-dimensional graphic display is operative to relate the process-variables in ordered sequence to respective axes of a set of parallel coordinate axes of the multi-dimensional graphic display representation, and to display the convex hulls for the successive pairs of process-variables in the ordered sequence between the axes identified individually with the process-variables of the respective pair of process-variables in the multi-dimensional graphic display representation, each of the convex hulls being indicative of a bound applicable as between the process-variables of the respective pair within the accumulated data-sets.

20. The system according to claim 17, wherein the means for deriving the further set of values is operative to derive these values selectively and sequentially with one another, and the means for defining the available ranges is operative to define and re-define those ranges according to the selections made of values of the further set of values.

21. The system according to claim 17, wherein the means for deriving a further set of values comprises means responsive to the current values of the process-variables during running of the process for supplying those current values as the further set, and wherein the system includes means for providing an alarm indication in respect of any process-variable for which the current value is outside the available range for that process-variable.

22. The system according to claim 21, wherein the alarm indication includes the display of an alarm marking against the available range violated.

23. A system for providing a display representation for use in selection of values for process-variables of a multi-variable process, comprising means for storing a multiplicity of data-sets accumulated during multiple runs of the process, each data-set comprising the values of the process-variables in an individual one of the multiple runs of the process, display means for providing a multi-dimensional graphic display representation comprising a multiplicity of mutually-spaced coordinate axes which are identified individually with respective ones of the process-variables, the graphic display representation including in accordance with the stored data-sets of values, display of a feasible region of the process-variables, and selection means that is operable successively to select, so as to fix, values within the region for all the process-variables in turn, the display means being operative upon each operation of the selection means to define available ranges for such of the other process-variables that remain of un-fixed value.

24. The system according to claim 23, wherein the display means includes an electronic display unit.

25. The system according to claim 23, wherein the display means determines the available ranges from convex hulls calculated for each pair of process-variables from the accumulated data-sets of values.

26. The system according to claim 25, wherein the process-variables are related in ordered sequence to respective axes of a set of parallel coordinate axes of the multi-dimensional graphic display representation, and convex hulls for the successive pairs of process-variables in the ordered sequence are displayed between the axes identified individually with the process-variables of that respective pair of process-variables in the multi-dimensional graphic display representation.

27. The system according to claim 26, wherein the value of the one process-variable is selected by selecting a position corresponding to that value along the first axis of the set of coordinate axes, and the multi-dimensional graphic display representation includes display of a polygonal line that extends from the selected position to intersect each individual axis of the other axes of the set of parallel coordinate axes at a position corresponding to the mid-point of the available range defined for the process-variable with which that individual axis is identified.

28. The system according to claim 27, wherein the display means is operative to display a new polygonal line in the multi-dimensional graphic display representation as the value of each successive process-variable is fixed by selection, the new line extending through positions which on the respective axes identified individually with the fixed-value process-variables correspond to the values selected, and which on the respective axes identified with the unfixed-value process-variables correspond to the mid-points of the available ranges of those unfixed-value process-variables.

29. The system according to claim 28, wherein the available range for each unfixed-value process-variable is displayed on the axis of that process-variable by an intercept therewith of divergent lines from the axis of the immediately preceding process-variable of the ordered sequence.

30. The system according to claim 25, wherein the definition of available ranges is effected in dependence upon the convex hulls which, for the time being, are applicable individually between such of the process-variables that remain of unfixed value and each of the fixed-value process-variables.

31. The system according to claim 23, wherein the graphic display representation includes display in respect of each of a plurality of the fixed-value process-variables, of a range within which the value of that process-variable may be changed while holding the others of the plurality of fixed-value process-variables at their fixed values.

32. The system according to claim 23, including further display means for providing a further multi-dimensional graphic display representation in parallel coordinates during running of the process, the further multi-dimensional graphic display representation displaying the values of the process-variables current during that run and providing alarm indication in respect of any of the process-variables for which the current value is outside current limits for that process-variable, the current limits being dependent upon the current values of the other process-variables and are calculated in accordance with the accumulated data-sets.

33. The system according to claim 32, wherein the current limits are displayed in the further graphic display representation, and the alarm indication includes display of an alarm marking against a current limit violated.

* * * * *